United States Patent [19]
Wentworth, Jr.

[11] Patent Number: 5,246,632
[45] Date of Patent: Sep. 21, 1993

[54] CIRCULATORY ION VAPOR GENERATOR AND METHOD

[76] Inventor: Fred A. Wentworth, Jr., R.F.D. 4, 100 Brentwood Rd., Exeter, N.H. 03833

[21] Appl. No.: 886,757

[22] Filed: May 21, 1992

[51] Int. Cl.$^5$ ............................................. B01F 3/04
[52] U.S. Cl. ................................. 261/29; 261/81; 261/84; 261/119.1
[58] Field of Search .................. 261/29, 84, 81, 119.1

[56] References Cited

U.S. PATENT DOCUMENTS

| | | | |
|---|---|---|---|
| 884,610 | 4/1908 | Rateau | 261/119.1 |
| 2,142,206 | 1/1939 | Patek | 261/84 |
| 3,015,554 | 1/1962 | Rummel | 261/119.1 |
| 3,398,935 | 8/1968 | Livesey et al. | 261/119.1 |
| 3,403,005 | 9/1968 | Portal | 261/119.1 |
| 3,843,521 | 10/1974 | Zeff | 261/84 |
| 3,862,819 | 1/1975 | Wentworth | 431/4 |
| 4,016,837 | 4/1977 | Wentworth | 123/25 |
| 4,255,360 | 3/1981 | Jeffries | 261/119.1 |
| 4,410,467 | 10/1983 | Wentworth | 261/18 |
| 4,530,803 | 7/1985 | Kuckens | 261/29 |
| 4,808,348 | 2/1989 | Rudick et al. | 261/DIG. 7 |
| 4,952,340 | 8/1990 | Wentworth, Jr. | 261/30 |
| 4,952,340 | 8/1990 | Wentworth | 261/30 |
| 5,028,315 | 7/1991 | Cruea et al. | 261/84 |

FOREIGN PATENT DOCUMENTS 564539  7/1960  Belgium ........................ 261/119.1

OTHER PUBLICATIONS

Hydrocarbon Technology Environement, Nelson et al "Augmentation of Gas Phase Comustion by Bubbling Combustion Air Through Water" pp. 273-289.
"The Ion Effect" by Fred Soyka et al, Bantam Books 1977.

*Primary Examiner*—Tim Miles
*Attorney, Agent, or Firm*—Hayes, Soloway, Hennessey & Hage

[57] ABSTRACT

An ion generator capable of producing a quantity of negative electrically charged ions comprises a container for a liquid including $H_2O$. A stirrer or pump imparts controlled rotation to the liquid, while maintaining continuous surface tension on the liquid surface.

20 Claims, 1 Drawing Sheet

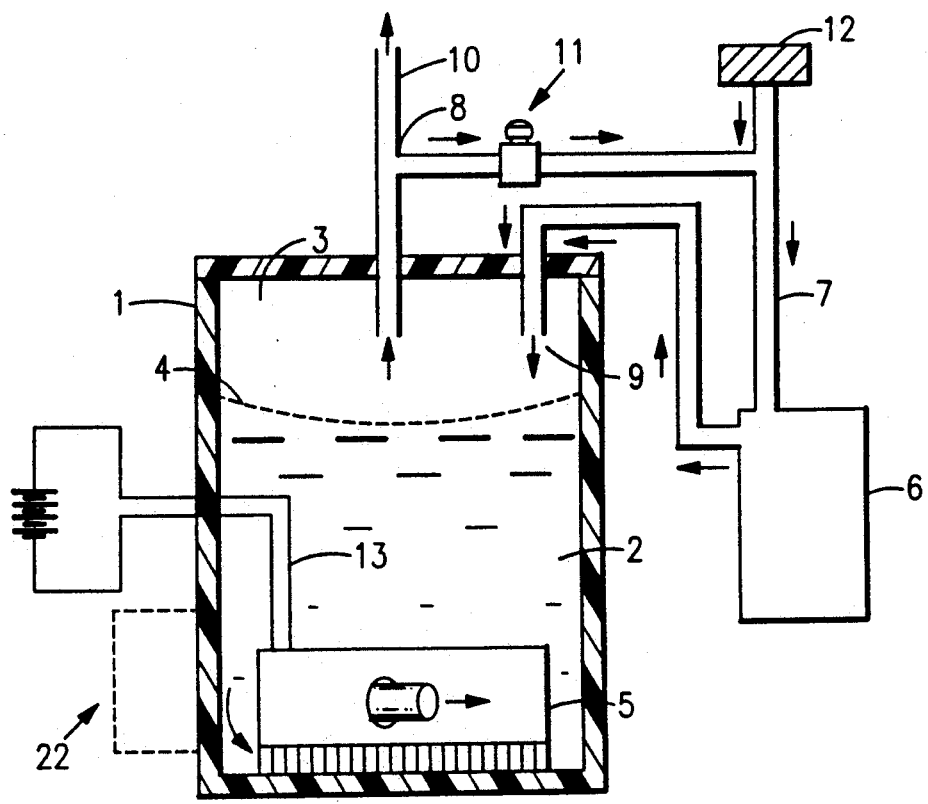
FIG.1
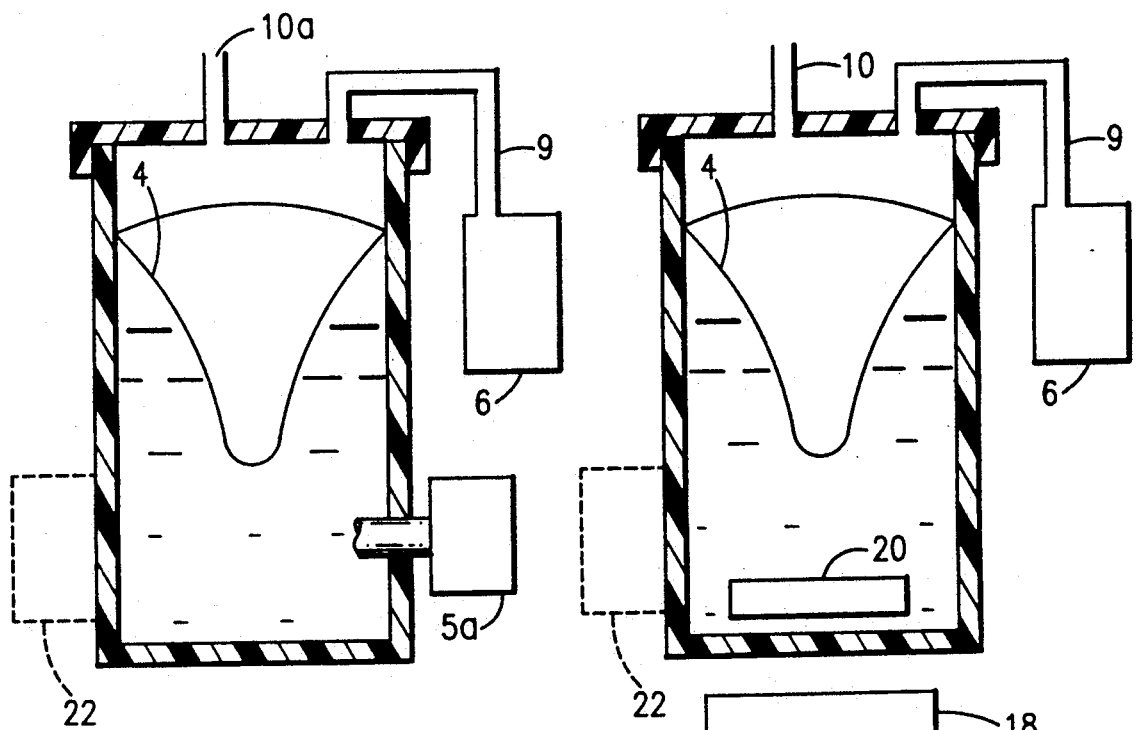
FIG.2
FIG.3

CIRCULATORY ION VAPOR GENERATOR AND METHOD

BACKGROUND OF THE INVENTION

1. Field of the Invention

The present invention relates to ion vapor generation and to improved devices for generating ion vapors. The invention has particular utility in combustion enhancement of furnaces using oil, gas, coal, wood and the like fuels, and to combustion enhancement of internal combustion engines using gasoline, diesel oil, and/or LNG, propane, or butane gas and the like fuels, and will be described in connection with such utility, although other utilities including, for example, the field of health for control of infectious airborne contaminants, irritants to breathing, and odors in the air are contemplated.

2. Description of the Prior Art

The presence of measurable amounts of water vapor is known to have a catalytic effect on improving the efficiency of fuel consumption in various combustion processes as is described in Van Nostrand's Scientific Encyclopedia, 4th Edition, at page 1501. For many years, bubbling vapor generators have been applied successfully on internal combustion engines. During the last several years improvements have been made in ion vapor generators for heating apparatus and related combustion furnace applications particularly as described in my earlier Pat. No. 4,952,340. The precise phenomenology by which water enhanced combustion has not been fully understood. A further puzzle has been that bubbling or agitating the water to produce hydroxyl ions, e.g. as described in my U.S. Pat. No. 4,952,340 and prior U.S. Pat. Nos. 3,862,819, 4,016,837 and 4,410,467 has usually further enhanced combustions, notwithstanding the fact that the mechanism by which negative ions are liberated from a liquid including $H_2O$, and why the bubbling or agitating process functioned better than other methods, is unknown. However, numerous tests substantiating the production of OH—(including mass spectrometry and electron miscrope and commercial use of the inventor's earlier ion vapor generator as described in the '340 patent, have demonstrated the benefits of the presence of a source of negative ion vapor to combustion processes. A research report of the inventor's earlier bubble ion vapor technology is given in Nelson, K. L. et al, "Augmentation of Gas Phase Combustion by Bubbling Combustion Air through Water", proceedings of alternative energy sources for; Hydrocarbon Technology environment (Ann Arbor, Mich.), Vol. 6, 1982, pages 273-289. Further, the beneficial reduction of odors in the air and reduction of air born irritants to breathing have been experienced by such use. Confirmation of the benefits derived from negative ion vapor to several human health related areas, such as retarding the presence of bacteria and resulting in infection, is documented in Soyka, Fred et al The Ion Effect; N.Y., Bantam Books, 1977, with additional references given in the bibliography.

SUMMARY OF THE INVENTION

The present invention provides an improved ion vapor generator for producing a quantity of electrically charged negative ions of the type particularly described in my earlier U.S. Pat. No. 4,952,340. The present invention is directed to an improved means for agitating the surface of a liquid including $H_2O$, to release negative ions into a head space adapted to accumulate ion vapors generated at the agitated surface. It provides means for controllably rotating the surface of the liquid held in the container while continuing to maintain continuous surface tension of the liquid. This controlled rotation, in addition to agitating the surface of the liquid also substantially increases the surface area of the liquid exposed to the interior of the container. In a preferred embodiment of the invention the ion vapor generator may include a vapor recirculating means for concentrating ion-enriched vapors and a liquid circulation pump which may be mounted within the container housing the liquid and $H_2O$ or mounted directly to said container to perform the function of imparting rotational forces to the liquid within the container. This rotation is without uncontrollable agitation of the liquid surface. Rotational forces may be equally imparted by mechanical means such as a magnetic stirrer placed below the surface of the liquid. The circulation pump and magnetic stirrer both impart an essentially circular motion to the liquid, but without disturbing the continuity of its surface tension. Vibration means may be coupled to the liquid, in addition to circulatory means, for imparting additional controlled agitation to the rotating liquid surface, further enhancing the generation of ion-enriched vapor.

BRIEF DESCRIPTION OF THE DRAWINGS

For the further understanding of the present invention, reference should be had to the following detailed description taken in connection with accompanying drawings wherein like numerals depict like parts, and wherein:

FIG. 1 is a schematic view, in cross section of one embodiment of circulatory ion vapor generator device made in accordance with the present invention;

FIG. 2 is a schematic view, in cross section of a second embodiment of circulatory ion vapor generator device made in accordance with the present invention; and FIG. 3 is a schematic view, in cross section of a third embodiment of circulatory ion vapor generator device made in accordance with the present invention.

DESCRIPTION OF PREFERRED EMBODIMENTS

FIG. 1 details a preferred embodiment of a circulatory ion vapor generator made in accordance with the present invention. It consists of a preferably substantially round liquid container 1 partially filled with a liquid 2 containing $H_2O$. The head space volume 3 above the liquid surface 4 is where the primary negative ion vapor accumulates after liberation from the liquid. A liquid pump 5 is placed within the liquid container 1 with electrical connection means 13 exiting the liquid and the container. The liquid surface 4 is caused to rotate by means of sub-surface liquid being circulated through said pump means 5. The rotation speed must be adjusted so as to substantially maintain continuous surface tension on the liquid surface 4. This rotation causes negative ions to be released from the liquid surface 4. Elevated levels of surface rotation that lead to substantial disruption of the surface tension will 1) significantly limit effective generation of negative ions and/or 2) cause undesired levels of positive ions to be generated in place of negative ions, defeating the purpose of negative ion generator.

An air pump means 6 recirculates the ion vapor in the volume 3 by drawing the vapor to the pump inlet 7 and returning it to the volume via the pump outlet 9 and the vapor return to the exit 8. A portion of the ion vapor flow exiting the pump 6 via the air pump outlet 9 is caused to flow through a conduit 10, the ion vapor being directed to the combustion process or other process. The portion of the ion vapor caused to divide and flow through, is controlled by the adjustment of vapor flow valve 11. The vapor flow valve can be replaced with a fixed restrictive orifice means where adjustment is not required. Ambient air is drawn in through a filter 12 and into the volume to replace that directed to a combustion process or other application. A one-way flow control valve to prevent back flow is optional and may be desirable in some applications.

A variation of the ion vapor generator made in accordance with the present invention is shown in FIG. 2. Here the circulation pump means 5a used to rotate the liquid is located external to the container 1. The circulation pump 5a acts to draw in and return liquid to the interior of the container in such a way as to create a rotation of the liquid and its surface. In this case there is no recirculation of the ion vapors, these vapors passing out of vapor feed line ion in the top of the container and air being forced into the container by pump 6.

A third embodiment of the circulatory ion vapor generator is shown in FIG. 3. This embodiment provides a magnetic stirrer 18 located external to the container and magnetically coupled to an impeller 20 located within the container for inducing rotation of the liquid within the container.

In each case a vibration means shown in phantom at 22 may be coupled to the container 1, e.g. as taught in my aforesaid '340 patent to impart additional controlled agitation to the surface of the liquid surface.

For application of the ion generator invention to odor control in a room or contaminants to breathing, the negative ion flow is directed through ion vapor feeds to the area requiring ion treatment.

The capacity requirements for optimum performance of a negative ion vapor generator is determined by the general combustion process or other requirements of the application to which it is applied.

EXAMPLE I

A plastic container (4 inch diam, 10 inch high) is provided as illustrated in FIG. 1. It was filled with ¼ gallons of distilled water to provide an ion collection volume of about 2 ½ inches above the liquid. At rest, the approximate liquid surface area was 12.5 $in^2$. A 12V-360 gph potted bilge pump was placed in the bottom of the container. The pump was about 3 inches high with about 2.5 inches diameter. With the pump operating at 100% capacity, the liquid circulated and achieved a concave shape with a surface area of approximately 14.0 $in^2$. Negative flow measurements in the vapor out of the vapor passage 10 was $10^{-9}$ ma.

When a magnetic stirrer was employed, a surface area of 20 inches could be achieved with A-ion output of $10^{-9}$ ma.

Various changes may be made in the foregoing invention without departing from the spirit and scope. For example, rotation of the liquid contents may be achieved using a mechanical stirrer coupled through a shaft to a motor external to the container. Also, the container could be rotated to impart rotation to the liquid. Rotation of the liquid also can be effected by magneto hydrodynamic rotation, or by means of air or gas jets.

I claim:

1. In an ion generator capable of producing a quantity of negative electrically charged ions comprising means for imparting agitation to the surface of a liquid including $H_2O$ within a container and adjusted so as substantially to maintain continuous surface tension on the liquid surface whereby to generate a vapor comprising negative electrically charged ions, and means for controllably withdrawing a flow of said ions from said container; the improvement wherein said means for imparting agitation to the surface of the liquid includes means for imparting controlled rotation to said liquid, said rotation still maintaining continuous surface tension on the liquid surface without creating turbulence.

2. The improved ion vapor generator of claim 1, and further including a flow control valve interjected in said outlet means for recirculating a controllable portion of said withdrawn ion vapor back to said container.

3. The improved ion vapor generator of claim 1, wherein said means for withdrawing comprises an air pump.

4. The improved ion vapor generator of claim 1, wherein said container provides a substantially round interior enclosure.

5. The improved ion vapor generator of claim 1, wherein said circulation means comprises a magnetic stirrer.

6. The improved ion vapor generator of claim 1, wherein said circulation means comprises a bilge pump located at least partially within said container.

7. The improved ion vapor generator of claim 1, and further comprising a vibration means for imparting controlled agitation to said liquid surface and adjusted so as substantially to maintain continuous surface tension on the liquid surface.

8. The ion vapor generator of claim 1, wherein said circulation means comprises a mechanical stirrer.

9. The improved ion vapor generator of claim 1, wherein said circulation means maintains a substantially unbroken surface tension condition across said liquid surface while inducing rotation in said liquid and said liquid surface.

10. A ion generator capable of producing a quantity of negative electrically charged ions comprising means for imparting controlled rotation to the surface of a liquid including $H_2O$ within a container and adjusted so as to substantially maintain continuous surface tension on the liquid surface without creating turbulence whereby to generate a vapor comprising negative electrically charged ions, and means for controllably withdrawing a flow of said ions from said container.

11. The ion generator of claim 10, wherein said rotation of said liquid surface maintains a substantially unbroken surface tension across said liquid surface while inducing said rotation.

12. A method of producing an excess over ambient concentrations of negative ions from a container partially filled with a liquid including $H_2O$, which comprises:

(a) imparting a controlled rotation to the surface of said liquid and adjusting the said rotation so as to substantially maintain continuous surface tension on the liquid surface without creating turbulence to produce and liberate a net surplus of said negatively charged ions;

(b) withdrawing at least a portion of said ion vapor from above said liquid surface in said container and recirculating at least a portion of said withdrawn ion vapor to said container; and (c) withdrawing a portion of said vapor-enriched with negative ions to a desired location.

13. The method of producing negative ions of claim 12, wherein the rotation of said liquid surface is maintained at levels which will sustain a substantially continuous surface tension condition across said liquid surface.

14. A method of improving quality of air which comprises treating said air with negative ions produced according to the method of claim 12.

15. A negative ion vapor generator device, comprising:

(a) a container with sealable cover;

(b) said container partially filled with a liquid containing $H_2O$;

(c) a means for inducing a controlled rotation to said liquid, said rotation being adjusted so as substantially to maintain continuous surface tension on the liquid surface;

(d) said rotation of said liquid induces a controllable essentially circular motion of a liquid surface while sustaining a substantially continuous surface tension condition, without creating turbulence, across said liquid surface;

(e) a first passage in said cover for admitting ambient air to said container; and (f) a second passage in said cover for controllably withdrawing electrically negative charged ion vapor from said container.

16. A negative ion vapor generator as recited in claim 15, in which the rotation inducing means comprises a pump which is at least partially submerged in said liquid, in said container whereby to transmit a controlled rotation of said liquid surface.

17. A negative ion vapor generator as recited in claim 15, in which the rotation inducing means comprises a pump located at least in part exterior to said liquid container whereby to impart controlled rotation of the liquid surface.

18. A negative ion generator as recited in claim 15 in which the rotation inducing means comprises a magnetic stirrer.

19. A negative ion vapor generator as recited in claim 15, and including an air pump for pumping ambient air into said liquid container, and for forcing said negative charged ion vapor to controllably flow out of said ion generator.

20. A negative ion vapor generator as recited in claim 15, and including an air pump for excavating ionized vapor from said vapor generator.

* * * * *